United States Patent [19]

Yang

[11] Patent Number: 5,318,645
[45] Date of Patent: * Jun. 7, 1994

[54] EVA INSOLE MANUFACTURING PROCESS

[76] Inventor: Kuo-Nan Yang, No. 1, Alley 104, Lane 270, Hsueh Shih Rd., Taichung, Taiwan

[*] Notice: The portion of the term of this patent subsequent to Aug. 25, 2009 has been disclaimed.

[21] Appl. No.: 20,390

[22] Filed: Feb. 22, 1993

[51] Int. Cl.⁵ .............................................. B29C 67/22
[52] U.S. Cl. ................... 156/79; 156/245; 264/45.1; 264/46.4; 264/245
[58] Field of Search ............ 156/79, 245; 264/45.1, 264/46.4, 321, 245

[56] References Cited

U.S. PATENT DOCUMENTS

| 2,772,196 | 11/1956 | Pooley | 156/79 |
| 4,021,380 | 5/1977 | Nuttall | 264/55 |
| 4,594,283 | 6/1986 | Ohigashi | 156/296 |
| 4,648,923 | 3/1987 | Chapnick | 156/245 |
| 4,674,204 | 6/1987 | Sullivan et al. | 264/244 |
| 5,141,578 | 8/1992 | Yang | 156/79 |
| 5,146,697 | 9/1992 | Weiss | 36/12 |

FOREIGN PATENT DOCUMENTS 57-025925  2/1982  Japan .................................... 264/55

Primary Examiner—Allan R. Kuhns
Attorney, Agent, or Firm—Bacon & Thomas

[57] ABSTRACT

An EVA insole manufacturing process includes a step of mixing an EVA resin with a foaming agent for producing a molding through squeezing and cutting procedures, and a step of heating the molding thus obtained in a mold so that it forms into a predetermined shape. Two or more moldings which respectively contain a different concentration of foaming agent or a different pigment color may be molded together so as to produce an insole which has different hardness and color at different parts thereof.

3 Claims, 2 Drawing Sheets

EVA INSOLE MANUFACTURING PROCESS

BACKGROUND OF THE INVENTION

The present invention relates to an EVA insole manufacturing process for making EVA (ethylene vinyl acetate copolymer resin) insoles.

U.S. Pat. No. 5,141,578 issued to the inventor of the present invention, discloses an EVA insole manufacturing process which includes a step of mixing an EVA resin with a foaming agent for producing a molding through an injection molding process, and a step of heating the molding thus obtained in a mold so that it foams into a predetermined shape. Two or more moldings which respectively contain a different concentration of foaming agent or a different pigment color may be put together in a common mold and subjected to integral foaming and form setting process, so as to produce an insole which has different hardness and color at different parts thereof. This EVA insole manufacturing process eliminates the disadvantages of a conventional EVA insole manufacturing process, which includes a first step to mix an EVA resin with a foaming agent and then squeezing the mixture into strips, a second step to place the EVA material strips in a hot press and letting it be subjected to a foaming process, a third step to place the foamed EVA strip in a water cooling trough for cooling and then cutting or trimming the foamed EVA strips, a fourth step to grind the EVA strips and then put them in a hydraulic machine for form setting. The EVA insole manufacturing process according to U.S. Pat. No. 5,141,578 consumes less human power, can fully utilize EVA material and greatly increase production capacity. However, it is still time consuming in forming a first molding and a second molding and form setting the integral molding obtained from putting the second molding within an opening on the first molding and heat foaming both the first and second moldings together in a mold. Further, this process needs much equipment including at least a crusher, an injection molding machine, a heat press, a hydraulic machine. Because of the use of the aforesaid necessary equipment, the hardware equipment cost and regular hardware equipment maintenance cost become inevitably high.

SUMMARY OF THE INVENTION

The present invention has been accomplished under the aforesaid circumstances. According to the present invention, an EVA insole is directly molded from a molding which is obtained from cutting an EVA resin and foaming agent mixture. This method eliminates the use of an injection molding machine and a crusher. The residual EVA material resulted from the cutting can be collected and then squeezed into flat blocks for use again, and therefore manufacturing loss is minimized.

DETAILED DESCRIPTION OF THE PREFERRED EMBODIMENTS

Figure 1:
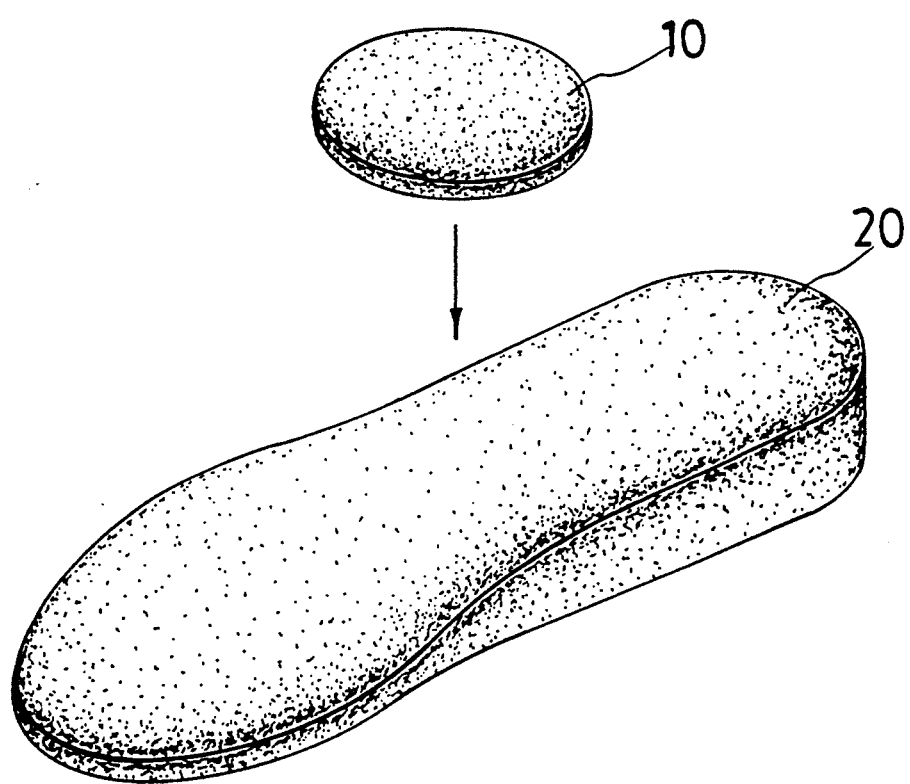
FIG. 1 illustrates a molding which is made of an EVA resin through squeezing and cutting procedures, and an insole which is made of a molding through foaming and form setting process.

Referring to FIG. 1, EVA resin is proportionally mixed with a foaming agent and then squeezed into a flat block. The flat block thus obtained is then properly cut and trimmed to form into moldings 10 according to a predetermined pattern. Each molding 10 is then placed in a mold and heated so that it foams. After the foaming process in the mold by use of a heat press, the foamed molding is removed from the mold and then, placed in a hydraulic machine for form setting. After form setting, a finished insole 20 is made.

Figure 2:
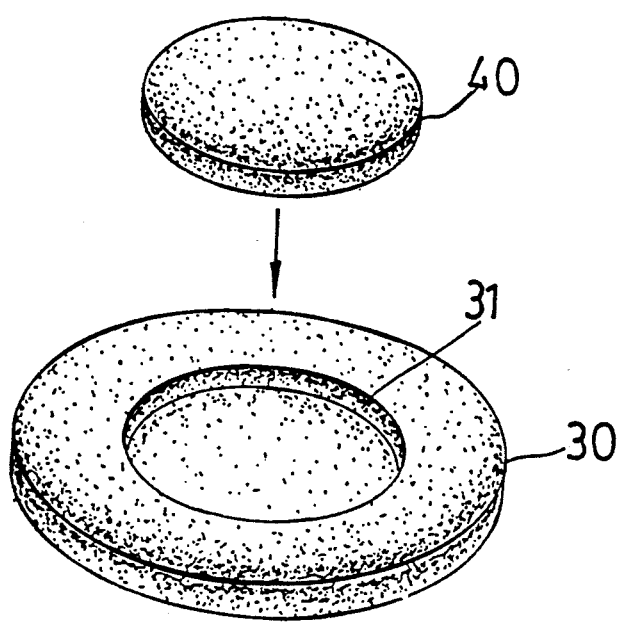
FIG. 2 illustrates two different moldings according to the present invention.
Figure 3:
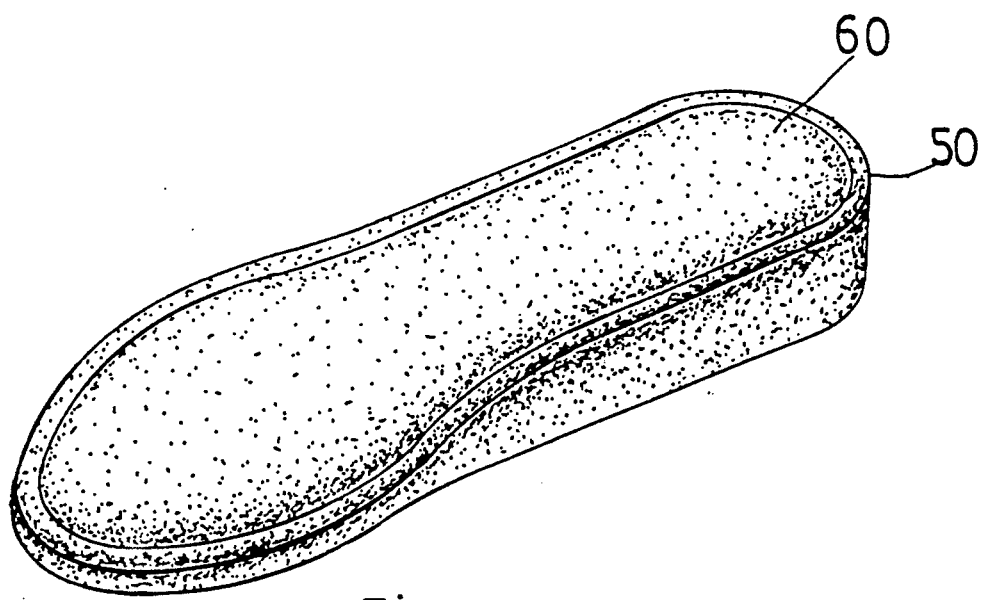
FIG. 3 illustrates an integral insole made of two different moldings according to the present invention.

An insole may be so made that its different parts have different hardness. As shown in FIG. 2, two separate moldings 30,40 are respectively made of different EVA materials through the aforesaid squeezing and cutting processes, wherein the EVA material for making a first molding 30 contains a foaming agent in a concentration different from the EVA material used for making a second molding 40. Further, the EVA material for making a first molding 30 may contain a pigment color which is different from the EVA material for making a second molding 40. The first molding 30 is relatively bigger, having a trough defined therein for receiving the second molding 40, so that the second molding 40 can be placed inside the first molding 30 and then both the first and second moldings are put into a mold of a hot press for foaming into an integral molding, which is then placed in a hydraulic machine and form set into a finished insole. The insole thus obtained has a unitary inner part 60 and outer part 50 in different hardness and/or color, as shown in FIG. 3.

As described above, an EVA insole in accordance with the present invention is made of EVA moldings through foaming and shape molding process, which EVA moldings are made of EVA material chips containing different concentrations of an EVA resin and a foaming agent and which are formed through squeezing and cutting procedures. Different parts of an insole can be made in different hardness and different color, as desired.

I claim:

1. An EVA insole manufacturing process comprising the steps of:
   (i) forming a first molding portion and a second molding portion respectively by the steps of:
      (a) mixing an ethylene vinyl acetate resin with a foaming agent according to a predetermined proportion, and squeezing the resulting mixture into a flat block; and,
      (b) cutting the respective flat block into the first molding portion and the second molding portion, so that the first molding portion has an opening for receiving the second molding portion;
   (ii) placing the second molding portion within the opening of the first molding portion;
   (iii) heat foaming both the first and second molding portions together in a mold to form an integrally molded article; and
   (iv) form setting the integrally molded article into an insole.

2. An EVA insole manufacturing process comprising the steps of:
   i) forming a first molding portion by the steps of:
      (a) mixing an ethylene vinyl acetate resin with a foaming agent according to a first concentration and squeezing the resulting mixture into a first flat block; and, b) cutting the first flat block into the first molding portion so that the first molding portion has an opening for receiving a second molding portion;

ii) forming a second molding portion by the steps of:

a) mixing an ethylene vinyl acetate resin with a foaming agent according to a second concentration different from the first concentration and squeezing the resulting mixture into a second flat block; and, b) cutting the second flat block into the second molding portion;

iii) placing the second molding portion within the opening in the first molding portion;

iv) heat foaming both the first and second molding portions together in a mold to form an integrally molded article; and, v) form setting the integrally molded article into an insole.

3. The method of claim 2 further comprising the step of adding a pigment color to one of the first and second molding portions such that the first and second molding portions have different colors.

* * * * *